INVENTOR
G. Constantinesco

Feb. 3, 1925.  1,525,269

G. CONSTANTINESCO
METHOD AND APPARATUS FOR TRANSMITTING POWER FROM
A STEADILY ROTATING SHAFT TO A DRIVEN SHAFT
Filed Feb. 28, 1923    3 Sheets-Sheet 2

INVENTOR
G. Constantinesco
by J. W. Surice
Atty.

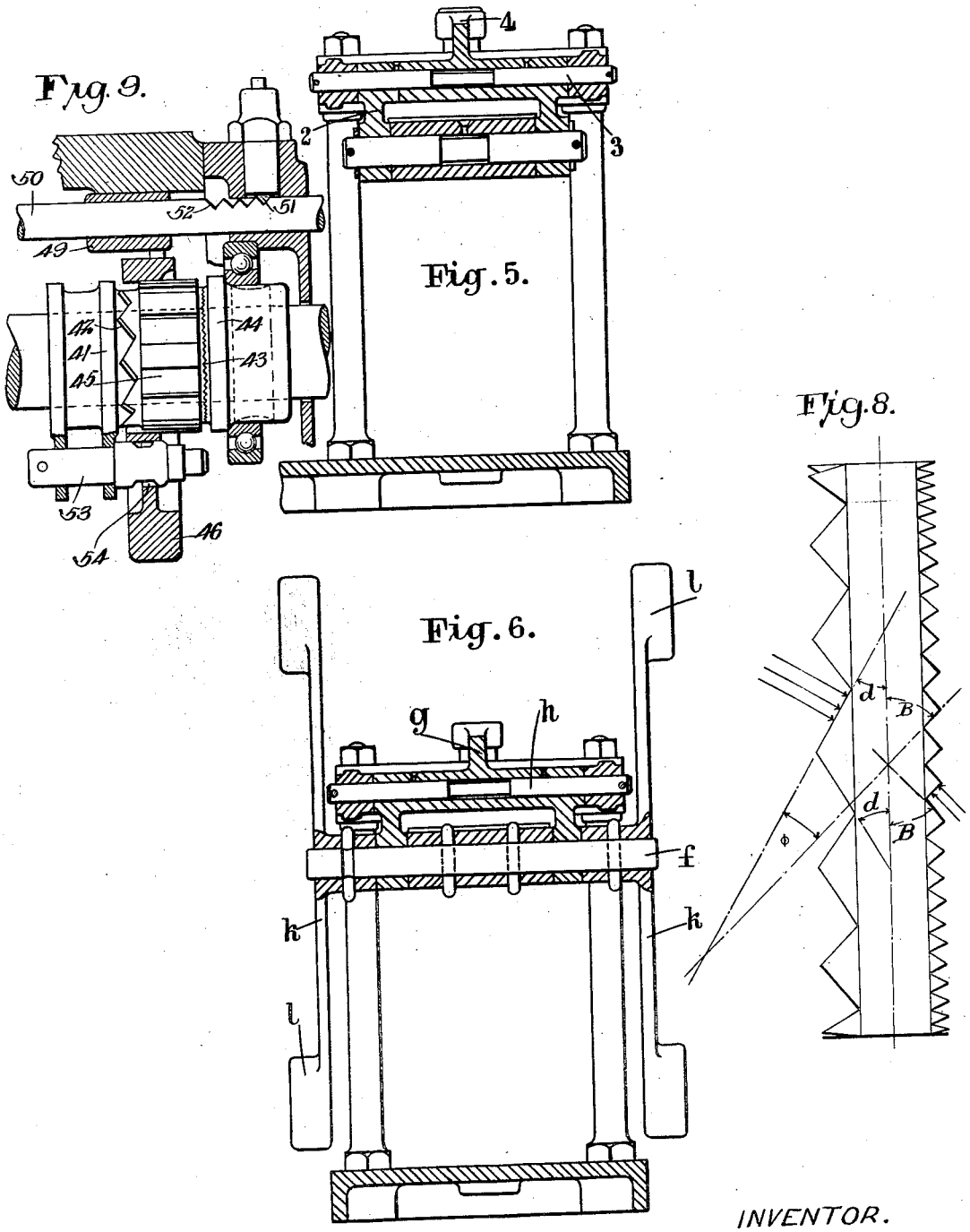

Patented Feb. 3, 1925.

1,525,269

UNITED STATES PATENT OFFICE.

GEORGE CONSTANTINESCO, OF WEYBRIDGE, ENGLAND.

METHOD AND APPARATUS FOR TRANSMITTING POWER FROM A STEADILY-ROTATING SHAFT TO A DRIVEN SHAFT.

Application filed February 28, 1923. Serial No. 621,895.

*To all whom it may concern:*

Be it known that I, GEORGE CONSTANTINESCO, a subject of the King of England, residing at "Carmen Sylva," Beechwood Avenue, Oatlands Park, Weybridge, in the county of Surrey, England, have invented certain new and useful Improvements in Methods and Apparatus for Transmitting Power from a Steadily-Rotating Shaft to a Driven Shaft, of which the following is a specification.

The present invention relates to methods and means for transmitting power from a prime mover to a shaft which is to be rotated against a variable resisting torque as described in my British patent specification No. 570,986, and has for its object to provide means by which the mean position of the parts is maintained independently of the direction of rotation of the driven member.

In the said specification, I have described various arrangements in which a steadily rotating crank transmits motion to a floating lever which is connected to an effective mass capable of oscillation and to a pair of unidirectional driving devices acting on a rotor.

With such a device the stability of the system, by which the mean position of the oscillating members is maintained, depends on the direction of rotation of the driven member.

According to the present invention the various parts are arranged in such a manner that the system is stable independently of the direction of rotation of the driven member.

The invention consists in constructing the apparatus so that the bearing of the oscillating effective mass has one degree of freedom in the line of the floating lever, while a second bearing with one degree of freedom is provided linked to a point on the mean line of the floating lever.

The invention further consists in securing the necessary degrees of freedom in the bearings by mounting the pivot of the effective mass on a link swinging about a fixed point and prevented from moving in one direction while free in the opposite direction, a point on the mean line of the floating lever being connected to a second link pivoted at a fixed point and free in one direction but prevented from moving in the opposite direction, the stops being so arranged that the freedom allowed to the pivoted links is in opposite directions.

The invention also consists in the improved means for rendering a system of the type described stable so that the mean position is maintained as hereinafter described.

Referring to the accompanying drawings:—

Figure 1 is a front elevation;

Figure 2 a plan of apparatus according to the invention;

Figure 5 is a section on the line 5—5, Figure 2;

Figure 6 is a section on the line 6—6, Figure 2;

Figure 8 is a diagram showing the arrangement of the teeth on the slider;

Figure 9 is a sectional elevation showing the unidirectional driving device.

Figure 1:
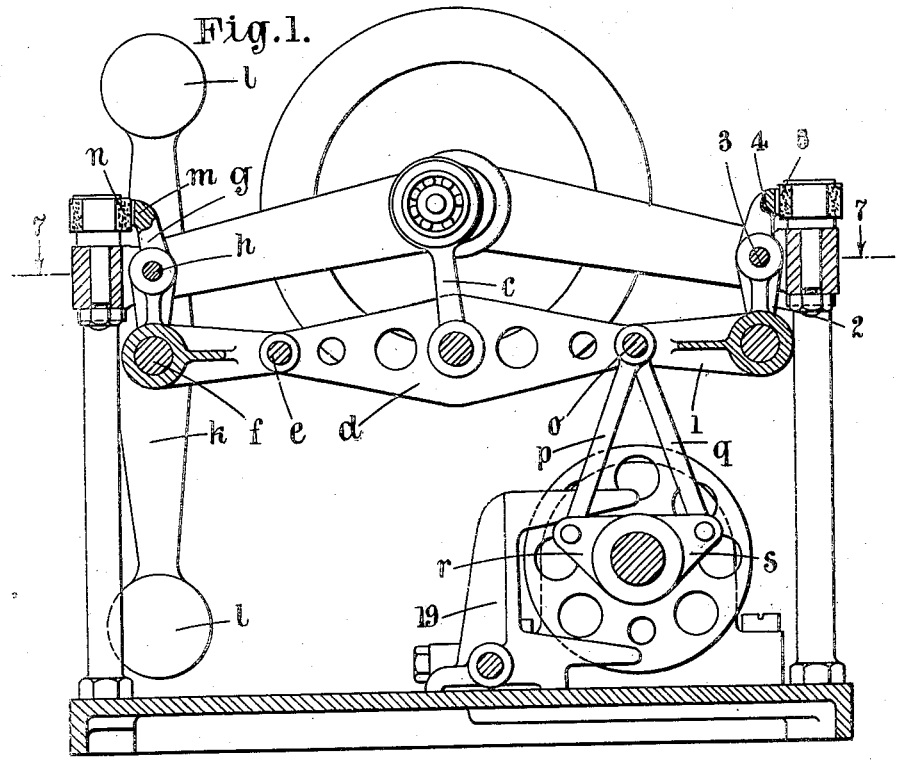
Figure 2:
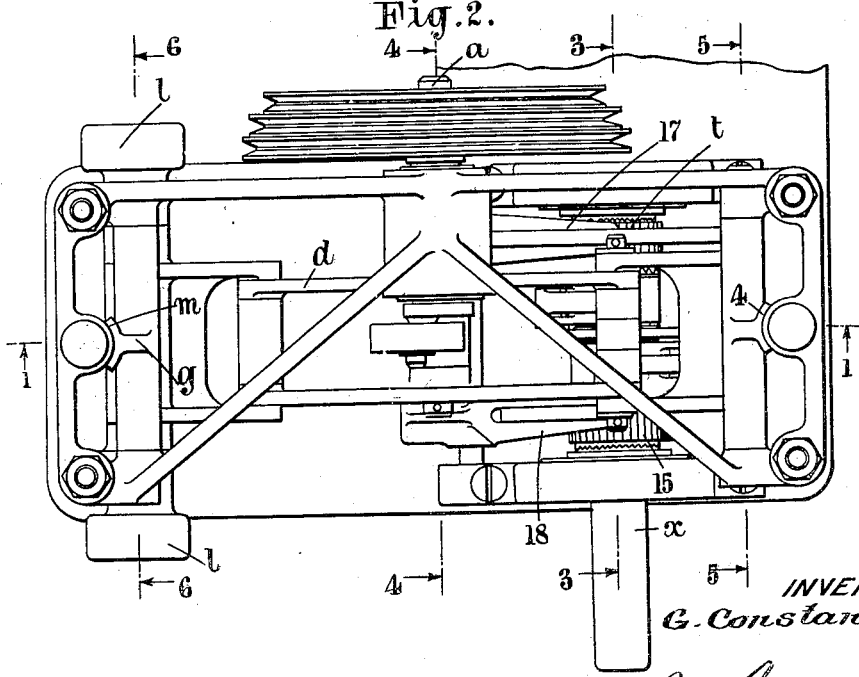
Figure 3:
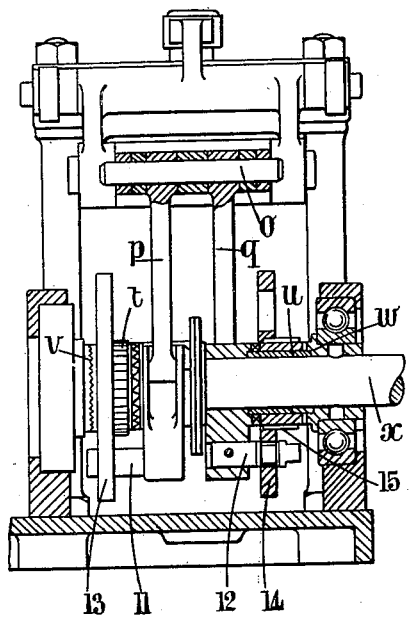
Figure 3 is a section on the line 3—3, Figure 2.
Figure 4:
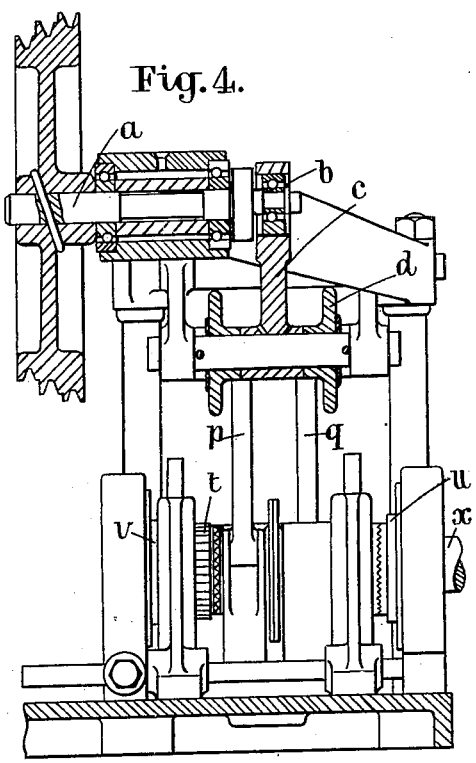
Figure 4 is a section on the line 4—4, Figure 2.
Figure 7:
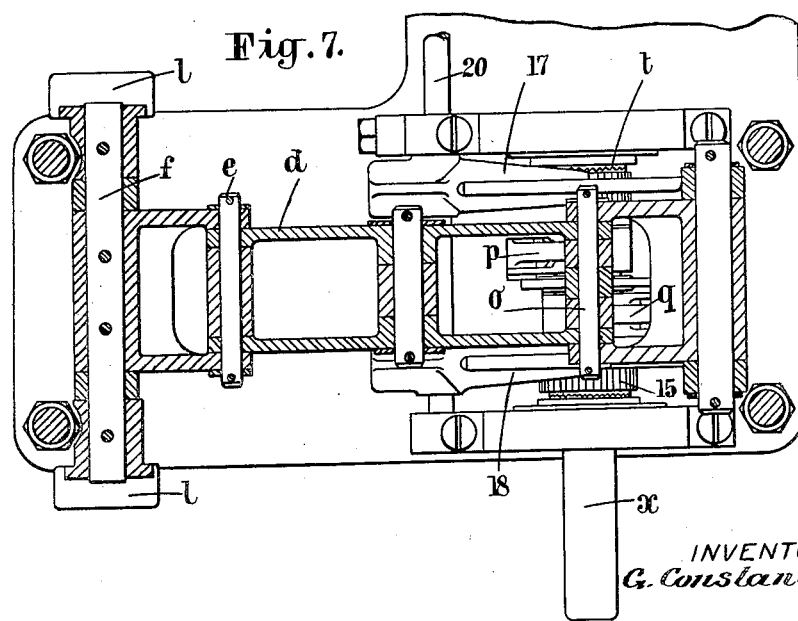
Figure 7 is a section on the line 7—7, Figure 1.

In carrying the invention into effect according to one example as applied to a case in which the constantly rotating crank is connected to one end of a floating lever which is connected at another point to a fly wheel capable of oscillation and at its other end to a pair of unidirectional driving devices acting on a rotor; the oscillating fly wheel instead of being pivoted at a fixed point is carried at one end of a link whose other end is pivoted at a fixed point. A stop is provided acting on this link and preventing motion in one direction, while allowing free movement in the opposite direction. Another point on the mean line of the floating lever is pivoted to a link also capable of swinging about a fixed pivot, a suitable stop being provided to prevent movement of this link in the direction in which the former link is free to move and to allow free movement in this direction in which the said former link is restrained.

With this arrangement, it will be seen that the whole system will be stable independently of the direction of rotation of the driven member. This will be obvious by considering that the condition of stability is that the forces reacting on the unidirectional driving devices from the driven member in all cases should be directed away from the pivot about which the oscillating effective mass turns.

In the form of the invention illustrated, the steadily rotating driving shaft $a$ carries an eccentric $b$ connected by a strap $c$ with a floating lever $d$. The floating lever is connected at one end $e$ to a pivot $f$ on a lever $g$ pivoted about a fixed axis $h$, the pivot $f$ also serving as the pivot of an oscillating inertia member $k$ in the form of the lever having masses $l$ at its ends. The lever $g$ is provided with an upward extension $m$ which serves as a stop acting against a fixed stop $n$. The other end of the floating lever $d$ is pivoted at $o$ to a pair of connecting rods $p$ $q$ operating oscillating members $r$ $s$ which act on sliding members $t$ $u$ which engage intermittently with members $v$ $w$ keyed to the rotor shaft $x$. The end $o$ of the floating lever $d$ is connected by a link 1 with a lever 2 pivoted at a fixed point 3 and carrying an abutment 4 adapted to engage with a fixed stop 5.

It will be seen that with this arrangement the mean position of the floating lever $g$ will vary according to the direction of rotation and consequent reaction through the connecting rods $p$ $q$ of the rotor on the end of the floating lever to which it is connected.

Referring to Figure 1, when the rotor is moving clockwise, it will be seen that the reaction tends to move the mean position of the floating lever to the left, consequently the abutment of the floating lever is in this case between the pad 4 and the stop 5 on the right hand side of the apparatus. For movement of the rotor in the reverse direction the reaction is in the opposite direction causing the abutmentment $m$ on the lever $g$ to bear against the fixed stop $n$.

The oscillating members $r$ $s$ carry pins 11, 12 passing through apertures in inertia rings 13, 14 which can slide axially on keys 15 on the sliders $t$ $u$. The rings 13, 14 are embraced by forks 17, 18 carried by a frame 19 which is movable in the axial direction by means of the rod 20. The pins 11, 12 are cut away so that in one position of the inertia rings relative movement is allowed in one direction between the slider and the oscillator so that the surfaces of the larger teeth ride in each other causing axial movement of the slider and engagement of the small teeth thereon with the small teeth on the rotor.

In the mean position of the rings relative movement of the slider and oscillator is prevented in either direction thus giving a free wheel position; while in a third position relative movement in the opposite direction is allowed causing engagement of the small teeth for movement of the oscillator in the opposite direction.

The method of constructing the teeth will be readily understood from the diagram, Fig. 8, illustrating the sliders $t$ $u$. The angle of inclination $\alpha$ to a plane perpendicular to the axis of the driving faces of the large teeth on the sliders $t$ and $u$ must be equal to the angle of inclination $\varepsilon$ of the driving faces of the small teeth to the same plane minus an angle at least equal to the angle of friction, that is if $\alpha$ is the angle of inclination of the large teeth, $\varepsilon$ the angle of inclination of the small teeth, and $\varphi$ an angle greater than the angle of friction, we must have $\alpha = \varepsilon - \varphi$. If desired instead of large teeth a helical gear may be employed in which case the angle $\alpha$ of the helix must be governed by the same relation. Friction surfaces may, if desired, be employed instead of the small teeth. In this case the angle $\varepsilon$ corresponds to the angle of friction between such frictional surfaces and if the angle $\alpha$ of the teeth or helix does not fulfill nearly enough the above relation the parts either slip or become firmly locked together and disengagement does not take place except under application of considerable forces.

In practice it has been found that the angle $\varphi$ must exceed the angle of friction between the materials employed when dry. Probably because the film or oil is temporarily expelled by the high pressure between the teeth at the moment of engagement. A value of the angle $\varphi$ which I have found suitable is about 15 degrees. If the teeth are constructed in this manner, a wedging action is obtained which gives a positive sliding action to the slider causing the small teeth on the friction surfaces to engage satisfactorily so that all parts then become jammed together and slip or disengagement during the driving period is prevented.

In all the mechanisms the clearances between the oscillator, slider and rotor must be arranged in such a way that when the large teeth are in mesh, the small teeth are clear in order to allow relative rotation.

It will be seen that when reversal of rotation of the driven member occurs, the reaction forces are also reversed, but by means of the half pivots which allow free motion in one direction only, the direction in which the axis of the pivoted inertia mass is restrained is also reversed, so that stability of the system is maintained independently of the direction of rotation of the driven member.

I claim:—

1. Apparatus for transmitting power from a prime mover to a shaft which is to be rotated against a variable resisting torque comprising in combination a driving shaft, a crank on said shaft, a floating lever, a connection from said crank to an intermediate point on said floating lever, a driven rotor, a pair of unidirectional driving devices acting on said rotor, connections from said floating lever to said unidirectional driving devices, an oscillating mass, a lever connecting said floating lever with said oscillating mass, said connecting lever being pivoted at a fixed point and a stop adapted to limit the movement of said connecting lever in one direction.

2. Apparatus for transmitting power from a prime mover to a shaft which is to be rotated against a variable resisting torque comprising in combination a driving shaft, a crank on said shaft, a floating lever, a connection from said crank to an intermediate point on said floating lever, a driven rotor, a pair of unidirectional driving devices acting on said rotor, connections from said floating lever to said unidirectional driving devices, an oscillating mass, a lever connecting said floating lever with said oscillating mass, said connecting lever being pivoted at a fixed point and a stop adapted to limit the movement of said connecting lever in one direction; a lever connected to the opposite end of said floating lever, said connected lever being pivoted at a fixed point and a stop limiting the movement of said connecting lever in one direction.

In testimony whereof I affix my signature.

GEORGE CONSTANTINESCO.